(12) United States Patent
Wenger

(10) Patent No.: US 9,273,910 B2
(45) Date of Patent: *Mar. 1, 2016

(54) FLUID CIRCUIT HEAT TRANSFER DEVICE FOR PLURAL HEAT SOURCES

(75) Inventor: Todd M. Wenger, Lancaster, PA (US)

(73) Assignee: Thermal Corp., Wilmington, DE (US)

( * ) Notice: Subject to any disclaimer, the term of this patent is extended or adjusted under 35 U.S.C. 154(b) by 669 days.

This patent is subject to a terminal disclaimer.

(21) Appl. No.: 12/247,082

(22) Filed: Oct. 7, 2008

(65) Prior Publication Data

US 2009/0025907 A1    Jan. 29, 2009

Related U.S. Application Data

(63) Continuation of application No. 10/685,954, filed on Oct. 15, 2003, now Pat. No. 7,431,071.

(51) Int. Cl.
| | |
|---|---|
| F28F 7/00 | (2006.01) |
| F28D 15/04 | (2006.01) |
| F28D 15/02 | (2006.01) |
| B01D 3/00 | (2006.01) |
| F28F 3/12 | (2006.01) |

(52) U.S. Cl.
CPC .......... *F28D 15/043* (2013.01); *F28D 15/0266* (2013.01); *B01D 3/007* (2013.01); *F28F 3/12* (2013.01)

(58) Field of Classification Search
CPC ... F28D 15/043; F28D 15/04; F28D 15/0266; B01D 3/007; F28F 3/12
USPC ................ 165/47, 104.26, 104.33, 80.4, 185, 165/80.5; 174/15.2, 16.3; 361/677, 659, 361/699, 700; 257/706, 714–717
See application file for complete search history.

(56) References Cited

U.S. PATENT DOCUMENTS

| | | | |
|---|---|---|---|
| 3,965,970 A | 6/1976 | Chisholm | |
| 4,036,291 A * | 7/1977 | Kobayashi et al. | 165/104.21 |
| 4,275,705 A | 6/1981 | Schaus et al. | |
| 4,295,067 A | 10/1981 | Binder et al. | |
| 4,337,825 A | 7/1982 | Stewart | |
| 4,382,466 A | 5/1983 | Shiraishi | |
| 4,685,512 A * | 8/1987 | Edelstein et al. | 165/104.26 |
| 4,785,875 A | 11/1988 | Meijer et al. | |
| 4,793,405 A | 12/1988 | Diggelmann et al. | |
| 5,198,889 A * | 3/1993 | Hisano et al. | 257/678 |
| 5,998,863 A * | 12/1999 | Kobayashi et al. | 165/104.33 |
| 6,223,810 B1 | 5/2001 | Chu et al. | |
| 6,269,865 B1 * | 8/2001 | Huang | 165/104.26 |
| 6,269,866 B1 * | 8/2001 | Yamamoto et al. | 165/104.26 |
| 6,293,333 B1 * | 9/2001 | Ponnappan et al. | 165/104.26 |
| 6,381,135 B1 | 4/2002 | Prasher et al. | |

(Continued)

FOREIGN PATENT DOCUMENTS

JP          61110883 A  *  5/1986

*Primary Examiner* — Travis Ruby
(74) *Attorney, Agent, or Firm* — Michael Best & Freidrich LLP

(57) ABSTRACT

A heat sink or heat transfer device particularly for integrated circuits, uses a phase change working fluid in a cyclic flow path having at least one evaporator that serves multiple heat sources. The evaporator can be an integral vessel made of thermally conductive material to which the multiple heat sources are coupled, preferably at evaporation points that are placed on opposite sides of a fluid reservoir for the liquid phase of the working fluid that feeds the evaporation points via capillary flow through a wicking material.

25 Claims, 3 Drawing Sheets

(56) References Cited

U.S. PATENT DOCUMENTS

| | | |
|---|---|---|
| 6,382,309 B1 | 5/2002 | Kroliczek et al. |
| 6,389,696 B1 | 5/2002 | Heil et al. |
| 6,615,912 B2 | 9/2003 | Garner |
| 6,981,543 B2 * | 1/2006 | Chesser et al. ........... 165/104.26 |
| 7,431,071 B2 * | 10/2008 | Wenger ........................ 165/47 |

* cited by examiner

FLUID CIRCUIT HEAT TRANSFER DEVICE FOR PLURAL HEAT SOURCES

CROSS-REFERENCE TO RELATED APPLICATIONS

This application is a continuation of U.S. patent application Ser. No. 10/685,954, filed Oct. 15, 2003, now U.S. Pat. No. 7,431,071, the entire contents of which is hereby incorporated by reference in its entirety.

FIELD OF THE INVENTION

The invention relates to a fluid heat transfer loop having circulating coolant in an evaporator coupled to a heat source and a condenser coupled to a heat sink spaced from the heat source. More particularly the invention concerns a thermally-powered heat transfer loop, containing a phase change coolant, with an evaporator that couples plural heat sources, potentially at different operational temperatures, into a same circulating coolant loop.

BACKGROUND OF THE INVENTION

Thermal energy transfer loops, known as heat pipes, can transfer heat energy efficiently from a heat source to a sink. Circulation of the heat-transfer coolant in the loop advantageously can be driven simply by the heat energy that the loop dissipates. In loops having a coolant phase change, from liquid to vapor at an evaporator that is thermally coupled with the heat source, and from vapor to liquid at a condenser that has capacity to absorb heat energy, the phase changes store and release a portion of the energy being moved. The heat source might be a semiconductor or integrated circuit, for example. The heat sink can be a finned air-heat exchanger for release of heat into the ambient air, another heat exchange fluid or loop, a thermally conductive mass such as a cabinet, etc.

There are design considerations for such heat pipes. The heat pipe typically needs sufficient capacity over a range of operational conditions to hold the temperature of the heat source below a desired maximum temperature. Providing heat transfer capacity may require efficiency and may dictate criteria such as minimum contact areas and/or coolant flow rates. The evaporator and the condenser should have close thermal coupling with the heat source and sink, respectively. To move heat energy, positive temperature differentials must be maintained along the heat transfer path from the source to the sink. The thermal transfer and fluid dynamic characteristics need to convey heat energy over a range of expected temperatures of the source and sink.

Preferably the device is compact and does not interfere unduly with access to structures associated with the heat source and sink. The device should robustly resist damage or deterioration. It should carry minimal expense. These design considerations affect one another. For example, increases in capacity generally also increase size or expense. What is needed is efficient thermal transfer activity and high thermal transfer capacity, in a small and inexpensive device.

Heat energy moves when there is a temperature difference between thermally related bodies, e.g., heat conductive materials in a conductive, convective or radiant relationship. Advantages are achieved if the temperature differences are arranged to produce phase changes in the coolant, i.e., cyclic changes of the coolant that store and release heat energy. The gaseous and liquid phases can diffuse and flow, which is potentially useful to move the coolant in one or both directions between the evaporator and the condenser.

The evaporator is heated by the heat source, causing liquid phase coolant in the evaporator to vaporize. Heat energy from the evaporator is transferred into the coolant by the phase change. The vapor phase coolant dissipates, some flowing to the condenser. The condenser is maintained at a lower temperature than the evaporator. Heat energy is coupled from the coolant into the condenser, dropping the temperature of the vapor coolant. The coolant condenses back to the liquid phase. The liquid phase coolant is conveyed back to the evaporator, for example by gravity flow, by capillary flow through a wick structure or other means. The cycle repeats.

So long as the condenser has an associated means to carry the heat away, the process continuously transfers heat energy away from the heat source. The condenser can dissipate the heat energy into a thermal sink such as the ambient air, using a finned heat exchanger, alone or assisted by forced air or the like.

The heat pipe structure generally involves a substantially closed, typically vacuum-tight envelope coupling the evaporator and condenser, and the coolant or working fluid. It is possible to rely on gravity flow from the condenser to the evaporator if the orientation of the device is assured. Where gravity is not reliable, for example as in portable electronic equipment, a wick between the condenser and the evaporator can provide capillary flow whereby the surface tension of the coolant is sufficient to power the return flow of coolant in the liquid phase. The wick can comprise particulate material adhered to the inside walls of the heat exchanger envelope.

When initially charged, the heat pipe envelope is evacuated and back-filled with a small quantity of working fluid, typically enough liquid coolant to ensure saturation of the wick. The atmosphere inside the heat pipe assumes an equilibrium of liquid and vapor phases. In the absence of a temperature difference between the evaporator and the condenser, the coolant remains more or less stagnant.

Heat energy added at the evaporator generates additional vapor and a slightly higher vapor pressure at the evaporator. Vaporization of the coolant stores a certain amount of thermal energy in the phase change. The vapor diffuses through the envelope to the condenser. At the condenser, the slightly lower temperature causes some of the vapor to condense giving up the stored thermal energy, known as the latent heat energy of vaporization. The condensed fluid flows back to the evaporator, e.g., driven by the capillary forces developed in the wick structure. If the thermal energy output of the heat source should increase, and assuming a constant temperature at the condenser (i.e., if the temperature difference increases), the rates of vaporization and condensation increase, and more heat energy is moved. However, heat energy can be can be moved even at low temperature gradients. The device adapts to dissipate heat as necessary. Its operation is driven only by the heat that it serves to transfer.

It is conventional in cooling integrated circuits for desktop computers, laptops, servers, power regulation devices and the like, to clamp an individual heat sink device to each integrated circuit or similar load that needs to be cooled. This technique contrasts with techniques that would couple the heat energy of several devices to one heat sink, for example typified by audio amplifiers that have several power transistors mounted to a single massive heat sink. If several heat sources are thermally coupled to the same heat sink, the hotter source(s) heat the cooler one(s) and vice versa. The operating temperature of the cooler sources is increased. The temperature gradient, particularly between the hotter source and the ambient, is reduced. Having a lower temperature gradient reduces the rate of thermal transfer to the ambient, i.e., reduces efficiency. It would be advantageous to deal with cooling of sources having different temperatures in a manner that does not simply average their output and instead benefits from the higher temperature gradient made possible by the higher temperature heat source.

Larger and smaller scale heat pipes are applicable to different situations where more or less heat is to be dissipated. The particular coolant can be chosen and its pressure conditions set so as to obtain cyclic phase changes at nominal operational temperatures. There is a challenge in the case of modern integrated circuit devices such as computer desktop and laptop devices, consumer electronics and similar equipment. Such equipment may have multiple digital processors or other large scale integrated circuits, each dissipating energy at a different but substantial rate. It is difficult to provide a heat sink heat pipe optimized for each heat source due to the range of different devices and the different operational and ambient conditions that may arise.

Moreover, providing a separate heat pipe for each of several heat sources generally requires a volume of air space for convection and/or a blower to force air over the individual heat pipes and possibly through the cabinet holding the equipment. What is needed is an efficient way to deal with plural heat sources producing different heat dissipation conditions, while keeping the overall cabinet compact and uncomplicated.

SUMMARY OF THE INVENTION

It is an object of the present invention to provide a practical arrangement for dissipating heat from two or more distinct heat sources that potentially produce different levels of heat energy, such as two integrated circuit packages on a printed circuit board.

It is also an object to couple plural heat sources into one heat exchange loop, but to do so in a manner that tends to allocate heat transfer capacity to each of the loads, rather than permitting the higher heat load(s) to dominate unduly.

It is another aspect to provide a way for heat loads to share access to a reservoir of coolant associated with the evaporator of a heat transfer loop, but to have distinct evaporating areas fed from the reservoir.

Another object is to enable one or more condensers to serve one or more loads in a single heat transfer loop from a location that need not be immediately adjacent to the loads.

These and other objects and aspects are met according to the invention by a heat sink or heat transfer device, particularly for integrated circuits, using a phase change working fluid in a cyclic flow path having at least one evaporator that serves multiple heat sources. The evaporator can be an integral vessel made of thermally conductive material to which the multiple heat sources are coupled, preferably at evaporation points that are placed on opposite sides of a fluid reservoir for the liquid phase of the working fluid that feeds the evaporation points via capillary flow through a wicking material. The reservoir can comprise one or more recessed wells in the bottom wall of an enclosure defining the evaporator, each of the evaporation points being located at a stepped surface adjacent to a well. A variety of specific configurations are provide and discussed below, wherein the heat sources are of unequal output, or are asymmetrically arranged, or are provided in arrays of two or more in one area of the evaporator.

In one embodiment, two integrated circuits or other heat source loads are cooled by an evaporator vessel that bridges over the two loads, the reservoir being provided at a recessed well between the two loads such that surfaces defining evaporation points abut the recessed well at stepped edges on the underside of the evaporator vessel. The evaporation points are supplied commonly with working fluid in the liquid phase from the recessed well. A vapor outlet is placed substantially over the recessed well, thus being positioned such that vapor from both evaporation points diffuses into the common vapor outlet. The vapor outlet has a relatively larger diameter compared to a liquid return path and is coupled in a circulating heat transfer path from the evaporator to a condenser such as a finned air heat exchanger that releases heat energy into the ambient air by convection. Condensed working fluid in the fluid phase is returned from the condenser to the well of the evaporator reservoir by a smaller diameter liquid return line.

The liquid flow can be assisted by gravity, assuming a given orientation of the device, but preferably the liquid flow paths contain wicking material such as sintered or adhered particles or fibers spaced closely so as to support capillary flow. In this manner the liquid phase working fluid is returned from the condenser to the reservoir regardless of orientation of the device and the influence of gravity on liquid flow.

BRIEF DESCRIPTION OF THE DRAWINGS

The foregoing features and advantages of the invention, as well as other aspects and routine extensions of the invention, are apparent from the following detailed description of examples and preferred embodiments, to be considered together with the accompanying drawings, wherein the same reference numbers have been used throughout to refer to the same functioning parts, and wherein.

DETAILED DESCRIPTION OF THE PREFERRED EMBODIMENTS

Figure 1:
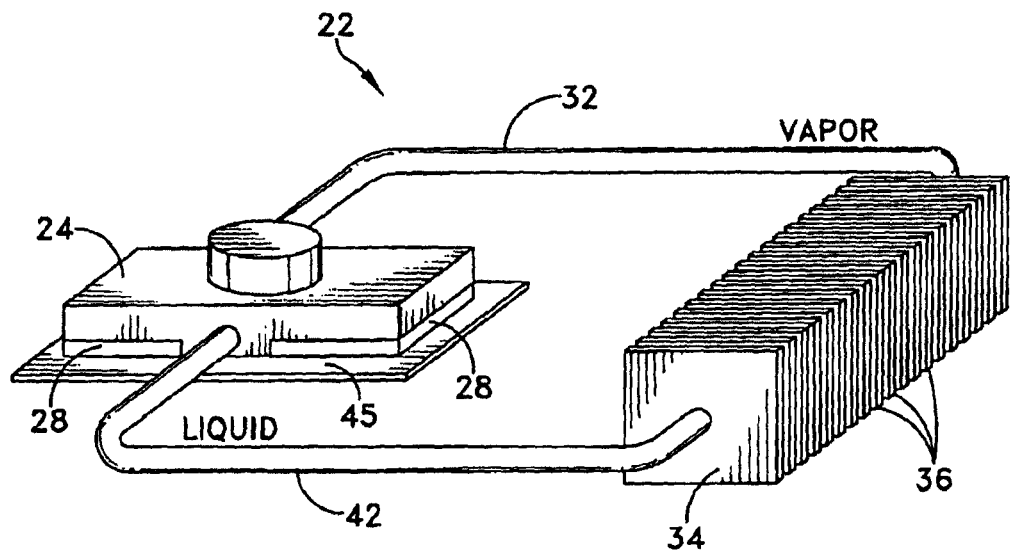
FIG. 1 is a perspective view of a circulating coolant heat pipe arrangement according to a first embodiment of the invention, comprising two evaporator sections for distinct heat sources, sharing a condenser, coolant reservoir and associated structures.

A number of exemplary embodiments of the invention are described herein with reference to the drawings, and demonstrate aspects of the invention in different forms. The different embodiments are intended to represent the aspects separately in some instances, not all of the embodiments incorporating all the alternatives mentioned herein. The drawings are not necessarily comprehensive or drawn to scale. Certain features of the invention are shown in schematic form in the interest of conciseness, or larger or smaller than their preferred size for purposes of emphasis.

The invention has attributes that may be affected in some of the embodiments by the orientation of the associated apparatus in use. The invention also has attributes intended in some of the embodiments to facilitate operation in different orientations.

In convection heating, for example, heating of a vapor decreases its density and results in heated vapor currents with upward gradients; however heat and vapor also diffuse outwardly, including downwardly. As to liquid, gravity can produce fluid flow with a downward gradient, but according to an aspect of the invention, liquid is movable by capillary action to flow in a direction that is not dependent on the tendency of liquid to seek its lowest level.

These considerations must be taken into account in interpreting terms and statements in this disclosure that have implications of relative direction or relative position such as "horizontal," "vertical," "up," "down," "top" and "bottom" as well as derivatives thereof (e.g., "horizontally," "downwardly," "upwardly," etc.). Such directional terms should not be assumed to define an orientation or relative position that is necessary. Directional terms as used in this disclosure should be construed to refer to the orientation as then being described or as shown in the drawing figure under discussion, and not as a requirement or implication of a limitation to that particular direction or orientation, unless specifically stated or unless apparent from the context.

Similarly, internally relative terms such as "inwardly" versus "outwardly," "longitudinal" versus "lateral," etc., are intended to relate to one another, or to a center of area, mass, elongation, rotation, etc. as indicated in context appropriate, without limitation to only one such form of reference. Stated attachments such as "coupled," "connected," "interconnected," and the like shall be construed to include a relationship wherein structures are secured or attached to one another either directly or indirectly through intervening structures, as well as both movable or rigid attachments or relationships, so as to support the pertinent functions with the described structures.

Throughout the drawings, the same reference numbers are used to refer to the same parts. Referring to FIG. 1, a single loop heat transfer circuit 22 comprises a vessel defining an evaporator 24 in thermal engagement with sources 28 of heat. The internal volume of the evaporator 24 is coupled by a vapor line 32 to a condenser 34 that is configured to release or further convey heat energy. In this example, condenser 34 has fins 36 for operation as a convection-driven air heat exchanger. A liquid return line 42 couples the condenser 34 to the evaporator 24, whereby a phase change working fluid contained in the heat transfer circuit is returned to the evaporator 24.

In a circulating loop, the working fluid is vaporized from its liquid to vapor phase at evaporator 24; conveyed as vapor through the vapor line 32 to the condenser 34; condensed at the condenser from the vapor phase to liquid, the condenser being kept at a lower temperature due to the escape of heat energy by convection; and caused to flow in the liquid phase from the condenser 34 back to the evaporator 24. Flow of vapor is driven by diffusion from the area of vaporization through the volume of the system 22, which is partially evacuated and closed off as a sealed envelope. Flow of liquid can be driven by gravity but preferably is driven by capillary action to diffuse in the liquid phase through a wicking material (not shown in FIG. 1) contained at least along internal walls of the liquid return line 42.

Figure 2:
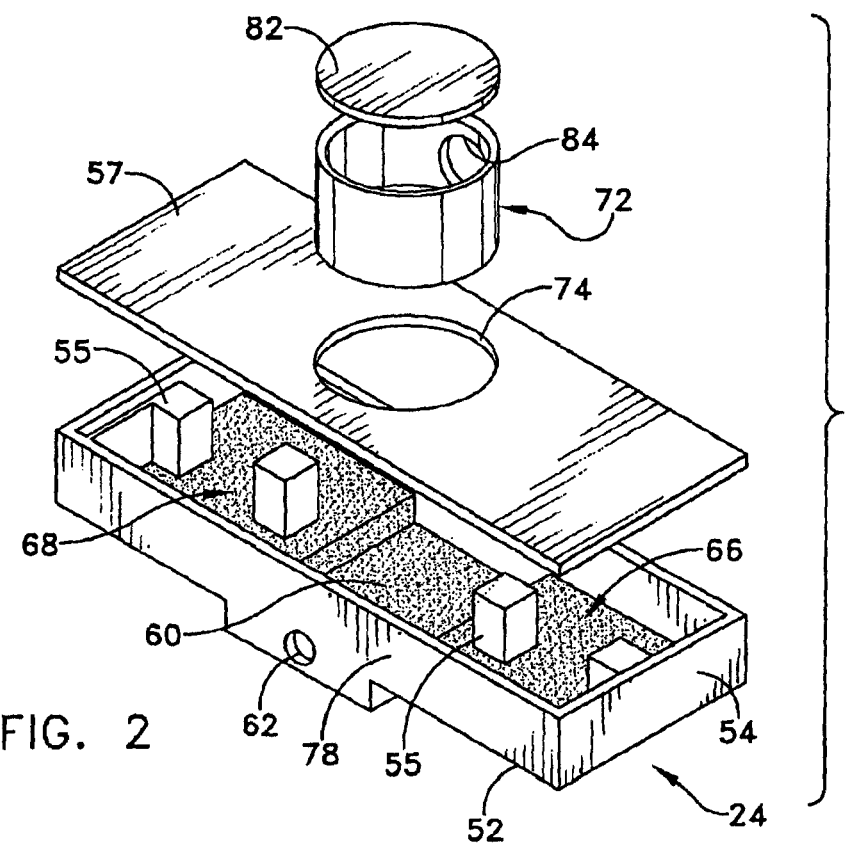
FIG. 2 is an exploded perspective view showing a detail of evaporator and coolant reservoir structures according to the embodiment of FIG. 1.
Figure 3:
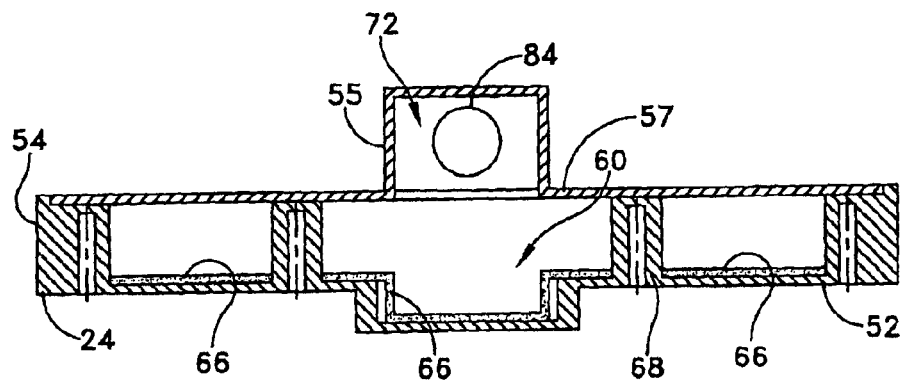
FIG. 3 is a longitudinal cross-sectional view the embodiment shown in FIG. 2 as assembled.

As shown in exploded view in FIG. 2 and in section in FIG. 3, the evaporator 24 in this embodiment is a substantially rectangular box having thermally conductive material such as aluminum or stainless steel sheet metal, at least along the surfaces to be placed in thermal contact with heat sources 32, namely on the bottom 52 of evaporator 24. As shown in FIG. 1, the heat sources can comprise two integrated circuit packages 28, 28, mounted at a space from one another on a printed circuit board 45 and arranged such that thermally conductive walls of the evaporator vessel 24 rest against the circuit packages 28 so as to absorb heat by conduction. Various known compounds such as phase change compounds (not shown) can be provided to fill any spaces between the circuit package and the conductive wall of the evaporator vessel 24, in this case the underside or bottom wall 52 of evaporator 24.

The side of the evaporator vessel 24 in contact with the heat sources 28 needs to be thermally conductive. The other parts of the evaporator 24, and the respective vapor and liquid lines 32, 42, need not be thermally conductive but nevertheless preferably are made of metal such as sheet metal or tubing, or in the case of the box portion of evaporator 24, perhaps as a cast or stamped box unit 54. Use of metal for the parts is generally convenient for shaping, for heat conduction where needed, to facilitate hermetic sealing of the elements to form a closed envelope, etc.

Regarding evaporator 24, FIG. 2 shows an arrangement in which the sidewalls and bottom are a cast metal unit 54 including standoff blocks 55 that also provide for threaded bores for receiving fasteners such as circuit-socket engaging spring clips (not shown). Portions of the bottom 52 of evaporator 24 can be sheet metal that is stamped or bent to shape. alternatively the bottom 52 can comprise multiple parts that are attached to one another and to the remaining parts of the evaporator, e.g., using solder, welding, adhesive or another technique. The lid part 57 of evaporator 24 likewise is attached around the edges of the box part 54, e.g., by adhesive or solder around their abutting edges.

In the central area of bottom wall 52, the evaporator has a recessed reservoir or well 60 to which liquid working fluid from the condenser 34 is returned to the evaporator 24 via a connecting opening 62 that is near the bottom of the evaporator sidewall in the area of the well. Wicking material 66 is provided at least along the sidewalls of the well 60 and on the inside surfaces 68 of the bottom wall 52 of the evaporator 24 in the zones over the integrated circuits or other heat sources 28. Thus, the working fluid in the well 60 is diffused in its liquid phase by capillary action and flows up onto the surfaces that are adjacent to the well 60 and over the heat sources 28. The liquid from the well 60 thereby at least wets the entire inner bottom of the evaporator, including the areas over the heat sources 28. Depending on the level of liquid working fluid in the evaporator, and assuming that the evaporator is in a horizontal orientation, the working fluid can be pooled to a depth exceeding the depth of the well 60, thus providing relatively shallower pooled areas over the heat sources 28. In any event, the heat sources tend to provide distinct spaced areas at which vaporization is concentrated, as well as general heating of the working fluid leading to vaporization over its surface.

The heat sources 28 vaporize the liquid coolant at the inner bottom 68 of the evaporator 24. The vaporizing working fluid moves by gaseous diffusion through the available volume of the evaporator 24, namely between the wetted wicking material on the bottom 68 and the underside of the evaporator lid 57. A central turret 72 is provided over a complementary-size hole 74 in the top wall or lid 57 of the evaporator 24, and functions as a vapor accumulator. The turret 57 optionally can be spaced inwardly from the lateral sidewalls 78 of the evaporator 24. The turret 57 has a soldered top lid 82 and a lateral opening to which the vapor line is coupled, also by soldering. The respective lids and the vapor opening are best shown in FIG. 3. The turret allows the connection to the vapor line 32 to be made at an elevation that is above the evaporator well 60, even if the evaporator is tipped laterally from the orientation shown in FIGS. 2 and 3. If the lateral inward space between the sidewall 78 and the vapor accumulating turret 57 provides a fluid space sufficient to accommodate the volume of fluid from well 60, the evaporator can be tipped laterally to 90° without causing liquid working fluid to flow into the vapor line 32.

Figure 4:
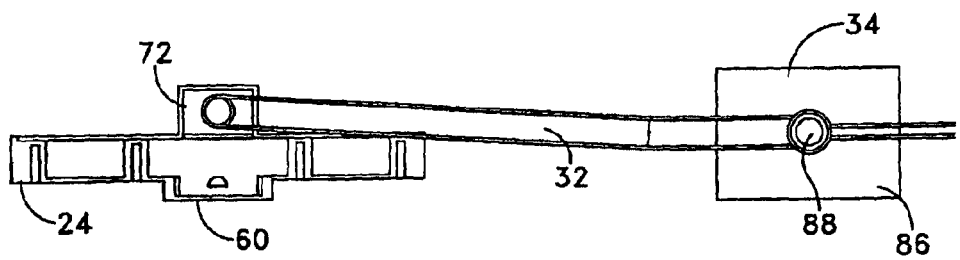
FIG. 4 is a partly sectional elevation view of the embodiment of FIG. 1.
Figure 5:
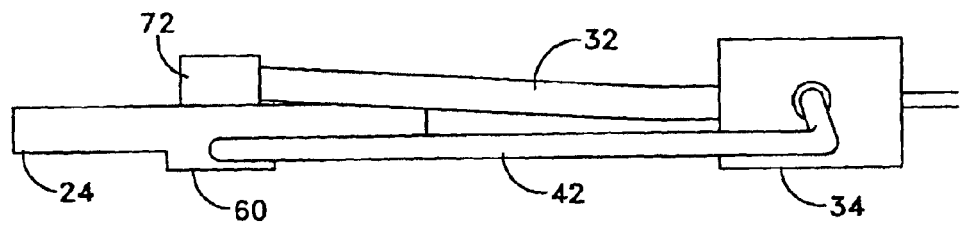
FIG. 5 is an elevation view corresponding to FIG. 4.

Referring again to FIG. 1, the condenser 34 comprises a stack of thin thermally conductive fins 86, preferably of sheet metal, providing a large area of surface contact with the air. The condenser 34 could provide a heat exchanger for another fluid such as a current of water (not shown) but in the arrangement shown is arranged to heat air that rises due to convection, producing a general upward air current in the area of the condenser 34 for carrying heat away heat. This action could be assisted by a blower (not shown) suitably mounted to force air over the fins 86. The fins can be separate sheets that are pressed and preferably soldered to a longitudinal metal tube 88 for good thermal conduction resulting in a relatively cool inner surface for contact with and condensation of the vaporized working fluid. Alternatively, a corrugated or other irregular surface can be provided in an integral piece of sheet material or the like. The longitudinal tube 88 forms a substantially central passage through the condenser 34, capped at the ends but for connections to the vapor and liquid lines (see FIGS. 4 and 5), and in the case of a known-orientation arrangement, optionally arranged at a downward tilt in the direction of flow. The vapor line 32 is coupled to the condenser pipe 88 at one end and the liquid return 42 line at the other end. The vapor line 32 has a relatively wider cross section than the liquid return line 42. The tube 88 in the condenser can have a progressively reducing diameter (not shown) proceeding through the condenser 34.

The wicking material 66 is provided in the return line 42, and preferably also lines the evaporator vessel 24 at least at the well and adjacent heating zones (the wicking material being internal and not shown in FIG. 1). The wicking material 66 can comprise fixed particles or strands, a reticulated or sponge-like material having voids, a combination thereof, etc. In the case of particles or strands, individual bodies can be sintered or adhesively adhered or simply compressed into place. The wicking material is structured to provide interstices or voids that are small compared to the dimensions of a droplet of the working fluid, which droplet could form due to the surface tension of the liquid working fluid at the pressure and temperature conditions in the envelope of the heat transfer device. Thus, the liquid phase working fluid tends to diffuse through the wicking material by capillary flow and does not depend on gravity. Capillary action ensures flow through the wicking material from the condenser 34 through the liquid return line 42 to the evaporator 24, without relying on gravity. However, in a situation where the orientation of the device is known and fixed, gravity can be employed wholly or partly as the operative force to cause flow of the working fluid in the liquid phase, i.e., down a slope defined by the return line (see, e.g., FIG. 5).

The working fluid may be selected from a variety of well known liquid/vapor phase change fluids selected and charged to a pressure that causes the phase change action to occur over the range of expected temperature conditions. The working fluid may include, for example, water, fluorinated hydrocarbon (e.g., Freon), ammonia, acetone, methanol, ethanol or combinations. Requirements for a suitable working fluid are compatibility with the wicking material on the internal walls of the envelope, at least along the liquid return line and the evaporator adjacent to the well, wettability of the wicking and wall materials, thermal stability, an operating vapor pressure that is not unduly high or low over the expected range of operating temperature, a high latent heat energy level stored and released during phase changes, high thermal conductivity, low liquid and vapor viscosities, high surface tension and acceptable freezing or pour point.

The quantity and pressure conditions of the working fluid in the heat transfer device needs to be sufficient so that the wicking material adjacent to the fluid well in the evaporator, namely the wicking material associated with the heat sources, is wetted at all conditions over the range of operational conditions. This condition often can be achieved by inserting sufficient liquid phase working fluid to saturate the wicking material before partially evacuating and sealing off the envelope of the device, for example by crimping and/or soldering a fill tube, shown in FIGS. 4 and 5.

The choice of thermally conductive materials, the phase change working fluid, the wicking material and other aspects, are subject to some variation. In one embodiment, the wicking material comprises micro-encapsulated phase change material particles, namely having adhered outer shells surrounding a phase change material. The shells as well as the various thermally conductive tubes and walls as shown can be chosen from the class of materials suitable for heat transfer applications and known in the art, e.g., metals such as, silver, gold, copper, aluminum, titanium or their alloys. Polymeric materials are also useful, including materials useful in the electronics industry for heat transfer applications, such as thermoplastics (crystalline or non-crystalline, cross-linked or non-cross-linked), thermosetting resins, elastomers or blends or composites thereof. Some examples of useful thermoplastic polymers are polyolefins such as polyethylene or polypropylene, copolymers (including terpolymers, etc.) of olefins such as ethylene and propylene, combinations thereof or with monomers such as vinyl esters, acids or esters of unsaturated organic acids or mixtures thereof, halogenated vinyl or vinylidene polymers such as polyvinyl chloride, polyvinylidene chloride, polyvinyl fluoride, polyvinylidene fluoride and copolymers of these monomers with each other or with other unsaturated monomers, polyesters, such as poly(hexamethylene adipate or sebacate), poly(ethylene terephthalate) and poly(tetramethylene terephthalate), polyamides such as Nylon-6, Nylon-6,6, Nylon-6,10, Versamids, polystyrene, polyacrylonitrile, thermoplastic silicone resins, thermoplastic polyethers, thermoplastic modified cellulose, polysulphones and the like.

In the embodiment of FIGS. 1-5, two heat sources 28 are mounted at the ends of a rectilinear evaporator 24 that substantially matches the footprint of the heat sources. The heat sources 28 are spaced by a distance that conveniently accommodates the well portion 60 of the evaporator 24 in the space between the heat sources (i.e., integrated circuit packages mounted in sockets on a circuit board. This is a compact arrangement. Although in FIG. 1, the vapor and liquid return lines 32, 42 are oriented to extend in opposite directions away from the evaporator 24, the particular route of the respective lines can be changed for convenience in connecting the respective parts in the available space. The condenser 34 likewise can be shorter and wider, or oriented so that the flow path through the condenser varies from that of the exemplary arrangement shown.

Figure 6A:
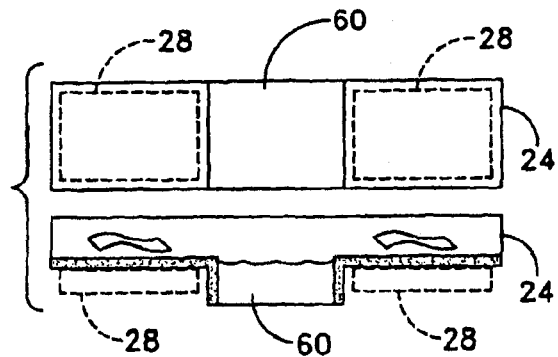
FIG. 6a is a combined elevation and plan view of an arrangement of heat sources coupled to an evaporator as in FIG. 1.
Figure 6B:
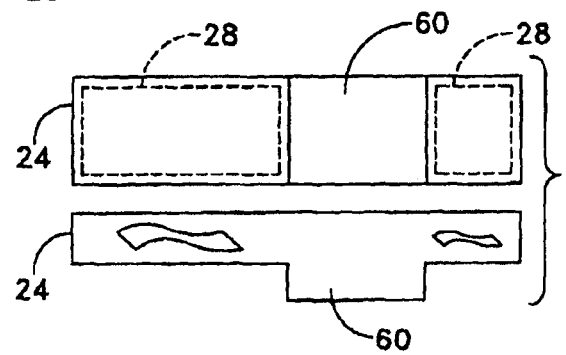
FIG. 6b is a combined view as in FIG. 6a, showing an alternative arrangement wherein the heat sources and evaporator are configured asymmetrically.
Figure 6C:
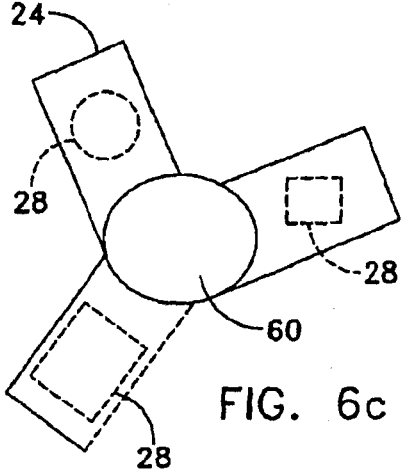
FIG. 6c is a plan view of a further alternative in which several evaporator legs radiate from a central reservoir area.
Figure 6D:
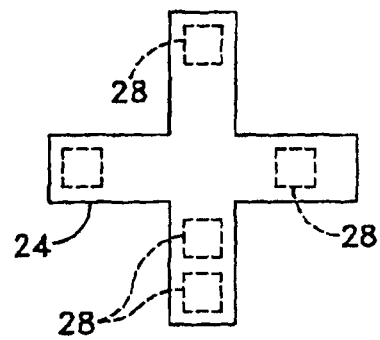
FIG. 6d is a plan view of an alternative in which plural heat sources are grouped in different areas of a shared symmetrical evaporator and shared reservoir arrangement.
Figure 6E:
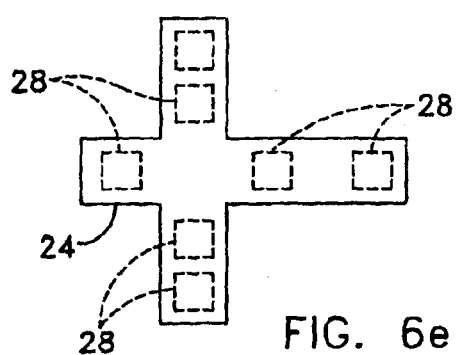
FIG. 6e is a plan view of another arrangement in which plural heat sources are grouped in a different configuration.

Moreover, FIGS. 6a through 6e illustrate a number of alternative and comparative arrangements. In FIG. 6a, two heat sources 28 are spaced symmetrically by the well 60 of an evaporator 24 (the connection line particulars not shown for clarity). This arrangement can be asymmetrical (FIG. 6b), for example to complement the expected heat energy output of unequal heat sources 28. The size, shape and position of the heat sources 28 can be varied, for example three different heat sources in a wye arrangement shown in FIG. 6c. Two or more heat sources 28 can share an evaporation space or chamber, symmetrically as in FIG. 6d or asymmetrically (FIG. 6e). These configurations are examples and other arrangements that vary in size, shape, heat source output, and other factors are possible.

In general, the heat transfer device 22 as disclosed is configured for removing heat energy from a plurality of heat loads 28. A heat exchange structure is provided containing a working fluid in a substantially closed envelope defining at least one evaporator 24 and at least one condenser 34 coupled to provide a circulating path for the working fluid, through vaporization of a liquid phase of the working fluid at the evaporator 24, condensation of a vapor phase of the working fluid at the condenser 34, and return of the working fluid from the condenser to the evaporator. According to an inventive aspect, the evaporator 24 defines a reservoir 60 for the liquid phase of the working fluid, and the evaporator 24 comprises at least two spaced evaporation points for application of heat energy from distinct ones of the heat loads 28, the two or more spaced evaporation points being commonly supplied with the liquid phase of the working fluid from the reservoir 60. The reservoir 60 in the embodiment of FIGS. 1-5 is defined at least partly by a depression in a bottom wall of the evaporator 24, preferably between evaporation points at which the heat sources 28 contact the evaporator 24. In other embodiments, the reservoir can be defined by a flat reservoir bottom.

In the embodiments shown, the evaporator 24 consists essentially of an integral vessel comprising thermally conductive material, said spaced evaporation points being located at spaced positions on the integral vessel, such as distinct areas of a bottom wall 68. It is also possible to embody the invention in a manner in which two heating zones are more discretely arranged but nevertheless share a reservoir or supply of working fluid and feed vapor to a common vapor accumulator 72 or vapor line 32, thereby functioning as one evaporator driven by two or more heat sources 28 that are potentially at different temperatures. Furthermore, the invention does not exclude the possibility of an arrangement, as otherwise shown in the drawings, wherein two or more such multiple heating zone evaporators are coupled in a heat transfer loop.

In the preferred arrangements, the reservoir 60 of working fluid is disposed between at least two such spaced evaporation points and feeds liquid phase working fluid to the evaporation points for vaporization. This can be efficiently accomplished without relying on orientation by coupling the fluid in the well or reservoir to one or both of the evaporation points via a wicking material 66 supporting capillary flow of the liquid phase of the working fluid. Alternatively or in addition, the well 60 could be arranged routinely to overflow onto flat, sloped, wicked or other surfaces defining the evaporation points.

In the arrangements shown in FIGS. 1-6b, the working fluid liquid reservoir is defined by at least one recessed well in the enclosure that defines the evaporator, namely in the form of an integral box-like structure with a low point in the bottom for the well 60 and the evaporation points being located on inside bottom walls 68 of the enclosure that are parallel to the bottom of the well 60 and adjacent to the well. In other particular arrangements, the well could be a curved bowl. The adjacent walls 68 also can slope upwardly from an intermediate area defining a central low point in a vee arrangement. Other particular shapes are likewise useful.

The spaced evaporation points are placed at different positions in the evaporator around the recessed well 60, especially at different positions around a perimeter of the recessed well and at an elevation higher than a bottom of the recessed well. In one arrangement, the evaporation points are in subsections of the evaporator that are more or less isolated because the points are in corridors or chambers that radiate outward from the well 60 or at least are on different points around a perimeter of the well. In this way, the temperatures maintained by the heat sources at the respective evaporation points are related to the heat outputs and temperatures of the sources 28, as opposed to having the hotter source effectively operated at a lower temperature than it otherwise might operate, due to conduction of heat energy from its evaporation point to nearby evaporation points of other normally cooler or lower heat energy sources.

In several of the illustrated embodiments, the enclosure comprises chambers radiating from a center, optionally a recessed well 60. The spaced evaporation points are placed on walls of the chambers that radiate, particularly bottom walls but also potentially the top, side or end walls of these chambers. The chambers can be symmetrically or asymmetrically arranged relative to one another and can be evenly or unevenly placed in relation to one another, the chambers and/or the respective energy outputs of the heat sources, and can comprise one or more than one source per identifiable unit of space or area.

It is to be understood that the present invention is by no means limited only to the particular constructions herein disclosed and shown in the drawings, but also comprises any modifications or equivalents within the scope of the claims.

What is claimed is:

1. A heat transfer device for removing heat energy from a plurality of electronic components separated from one another, the heat transfer device comprising:

a heat exchange structure containing a working fluid in a closed envelope defining an evaporator and a condenser that are coupled by a vapor line and a liquid return line to provide a circulating path for the working fluid, through vaporization of a liquid phase of the working fluid at the evaporator, condensation of a vapor phase of the working fluid at the condenser, and return of the working fluid from the condenser to the evaporator through the liquid return line;

wherein the evaporator comprises a bottom wall having a first single planar portion and one or more first side walls defining a reservoir and a second single planar portion and a third single planar portion with each of the second and third single planar portions elevated with respect to the first single planar portion and each of the second and third single planar portions at least partially defining respective evaporation chambers adjacent the reservoir, the evaporation chambers each being further defined by one or more second side walls adjacent the respective second and third single planar portions, the reservoir in flow communication with the liquid return line and positioned below the evaporation chambers, the evaporation chambers in flow communication with the vapor line, each of the second and third single planar portions provides a contact surface for application of heat energy for at least one of the plurality of electronic components and defines an evaporation surface disposed adjacent to and opposite a respective contact surface with the evaporation surfaces spaced apart from one another by the reservoir, and the evaporation chambers are supplied with the liquid phase of the working fluid from the reservoir, wherein each of the second and third single planar portions extends to the reservoir and each of the first, second, and third planar portions extends parallel to one another and orthogonal to the first one or more side walls.

2. The heat transfer device according to claim 1, wherein the evaporator consists essentially of an integral vessel comprising thermally conductive material, the evaporation chambers being located at spaced positions within the integral vessel.

3. The heat transfer device according to claim 1, wherein the reservoir is defined by at least one recessed well positioned in an enclosure defining the evaporator, the evaporation chambers being located between walls of the enclosure.

4. The heat transfer device according to claim 3, wherein the evaporation chambers are asymmetrically arranged relative to one another.

5. The heat transfer device according to claim 3, wherein the evaporation chambers extend to different radial distances from the reservoir.

6. The heat transfer device according to claim 5, wherein at least one of the second and third portions of the bottom wall comprises a contact point for more than one of the plurality of electronic components.

7. The heat transfer device according to claim 5, wherein each of the second and third portions of the bottom wall comprises a contact point for more than one of the plurality of electronic components.

8. The heat transfer device according to claim 1, wherein the evaporation chambers are placed at different positions in the evaporator around the reservoir.

9. The heat transfer device according to claim 8, wherein the evaporation chambers are placed at different positions around a perimeter of the reservoir.

10. The heat transfer device according to claim 9, further comprising a vapor outlet opening defined in a wall of the evaporator so as to be in flow communication with the vapor line, whereby vapor from the evaporation chambers diffuses commonly into the vapor outlet.

11. The heat transfer device of claim 1, further comprising a wicking material on the second and third portions of the bottom wall, wherein the reservoir contains the liquid phase of the working fluid to a level that is disposed below the evaporation chambers, covering the first portion of the bottom wall with the liquid phase of the working fluid, and leaving the wicking material on the second and third portions of the bottom wall exposed directly to the evaporation chambers when the bottom wall is horizontally oriented, the wicking material on the second and third portions of the bottom wall extending into the reservoir such that the liquid phase of the working fluid is diffused by capillary action and flows up onto the second and third portions of the bottom wall.

12. The heat transfer device according to claim 1, further comprising a vapor outlet opening defined in a wall of the evaporator so as to be in flow communication with the vapor line, whereby vapor from the evaporation chambers diffuses commonly into the vapor outlet, wherein the vapor outlet is located directly above the reservoir.

13. A heat transfer device for removing heat energy from a plurality of electronic components separated from one another, the heat transfer device comprising:
a heat exchange structure containing a working fluid in a closed envelope defining an evaporator in flow communication with a vapor line, a condenser coupled to the evaporator by the vapor line, and a liquid return line to provide a circulating path for the working fluid, through vaporization of a liquid phase of the working fluid at the evaporator, condensation of a vapor phase of the working fluid at the condenser, and return of the working fluid from the condenser to the evaporator through the liquid return line;
wherein the evaporator comprises a bottom wall having a first portion at least partially defining a reservoir, and second and third portions extending to the reservoir and each being elevated with respect to the first portion and each of the second and third portions at least partially defining respective evaporation chambers adjacent the reservoir, the evaporation chambers each being further defined by one or more side walls adjacent the respective second and third portions, the reservoir in flow communication with the liquid return line, wherein each of the second and third portions provides a contact surface for application of heat energy for at least one of the plurality of electronic components and defines an evaporation surface disposed adjacent to and opposite a respective contact surface with the evaporation surfaces spaced apart from one another by the reservoir and the entirety of each evaporation surface defines a single plane, and wherein the evaporation surface of each of the second and third portions has a perimeter, respectively, defined by the one or more side walls and the reservoir and each evaporation surface perimeter is contiguous with a perimeter of the reservoir, and wherein the reservoir separates the evaporation surfaces so that the entirety of the perimeters are not in contact with one another.

14. The heat transfer device according to claim 13, wherein at least two of the plurality of electronic components produce a different level of heat energy.

15. The heat transfer device according to claim 13, wherein the evaporator includes a vapor accumulator, the vapor accumulator defining an aperture for connection of the evaporator to the vapor line.

16. The heat transfer device according to claim 15, wherein the vapor accumulator is located directly above the reservoir.

17. The heat transfer device according to claim 13, wherein the condenser comprises a conduit extending between the vapor line and liquid return line, and a plurality of fins in direct contact with the outer surface of the conduit.

18. The heat transfer device of claim 13, further comprising a wicking material on the second and third portions of the bottom wall, wherein the reservoir contains the liquid phase of the working fluid filled to a level that is disposed below the evaporation chamber, covering the first portion of the bottom wall with the liquid phase of the working fluid, and leaving the wicking material on the second and third portions of the bottom wall exposed directly to the evaporation chamber when the bottom wall is horizontally oriented, the wicking material on the second and third portions of the bottom wall extending into the reservoir such that the liquid phase of the working fluid is diffused by capillary action and flows up onto the second and third portions of the bottom wall.

19. A heat transfer device for removing heat energy from a plurality of electronic components separated from one another, the heat transfer device comprising:
a heat exchange structure containing a working fluid in a closed envelope defining an evaporator arranged in flow communication with a vapor line and a liquid return line, and a condenser that is coupled to the evaporator by the vapor line and the liquid return line so as to provide a circulating path for the working fluid, through vaporization of a liquid phase of the working fluid at the evaporator, condensation of a vapor phase of the working fluid at the condenser, and return of the working fluid from the condenser to the evaporator through the liquid return line;

wherein the evaporator comprises a bottom wall having a first portion at least partially defining a reservoir and second and third portions extending immediately adjacent to the reservoir and each being elevated with respect to the first portion, each of the second and third portions positioned to provide a contact surface for at least one of the plurality of electronic components, and each of the second and third portions at least partially defining respective evaporation chambers adjacent the reservoir, the evaporation chambers each being further defined by one or more side walls adjacent the respective second and third portions, the reservoir in flow communication with the liquid return line, the evaporation chambers supplied with the liquid phase of the working fluid from the reservoir, wherein each of the second and third portions defines an evaporation surface disposed adjacent to and opposite a respective contact surface with the evaporation surfaces spaced apart from one another by the reservoir, and wherein the entirety of each evaporation surface of each of the second and third portions extends in a single plane and has a perimeter, respectively, defined by the one or more side walls and the reservoir, and wherein the reservoir separates the evaporation surfaces so that the entirety of the perimeters are not in contact with one another.

20. The heat transfer device according to claim 19, wherein at least two of the plurality of electronic components produces a different level of heat energy.

21. The heat transfer device according to claim 19, wherein the evaporator includes a vapor accumulator, the vapor accumulator defining an aperture for connection of the evaporator to the vapor line.

22. The heat transfer device according to claim 21, wherein the vapor accumulator is located directly above the reservoir.

23. The heat transfer device according to claim 19, wherein the condenser comprises a conduit extending between the vapor line and liquid return line, and a plurality of fins in direct contact with the outer surface of the conduit.

24. The heat transfer device according to claim 19, and further comprising standoff blocks which extend between the bottom wall an opposite top wall of the evaporator.

25. The heat transfer device of claim 19, further comprising a wicking material on the second and third portions of the bottom wall, wherein the reservoir contains the liquid phase of the working fluid filled to a level that is disposed below the evaporation chamber, covering the first portion of the bottom wall with the liquid phase of the working fluid, and leaving the wicking material on the second and third portions of the bottom wall exposed directly to the evaporation chamber when the bottom wall is horizontally oriented, the wicking material on the second and third portions of the bottom wall extending into the reservoir such that the liquid phase of the working fluid is diffused by capillary action and flows up onto the second and third portions of the bottom wall.

\* \* \* \* \*